US011068304B2

(12) United States Patent
Li et al.

(10) Patent No.: US 11,068,304 B2
(45) Date of Patent: Jul. 20, 2021

(54) INTELLIGENT SCHEDULING TOOL (71) Applicant: Microsoft Technology Licensing, LLC, Redmond, WA (US)

(72) Inventors: Jinchao Li, Redmond, WA (US); Xinying Song, Redmond, WA (US); Ah Young Kim, Redmond, WA (US); Haiyuan Cao, Bellevue, WA (US); Yu Wang, Redmond, WA (US); Hui Su, Bellevue, WA (US); Shahina Ferdous, Redmond, WA (US); Jianfeng Gao, Redmond, WA (US); Karan Srivastava, Seattle, WA (US); Jaideep Sarkar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 171 days.

(21) Appl. No.: 16/285,170

(22) Filed: Feb. 25, 2019

(65) Prior Publication Data
US 2020/0273000 A1 Aug. 27, 2020

(51) Int. Cl.
*G06F 9/48* (2006.01)
*G06F 9/46* (2006.01)
(Continued)

(52) U.S. Cl.
CPC .......... *G06F 9/4881* (2013.01); *G06F 9/5005* (2013.01); *G06K 9/6217* (2013.01);
(Continued)

(58) Field of Classification Search
CPC ............. H04M 3/5158; H04M 3/5183; H04M 5/42042; H04M 2203/357; G06Q 30/0201; G06Q 10/067; G06Q 10/1097
(Continued)

(56) References Cited

U.S. PATENT DOCUMENTS 6,163,607 A * 12/2000 Bogart ................ H04M 3/5233
379/265.02
6,173,053 B1 * 1/2001 Bogart ................ H04M 3/5233
379/265.02
(Continued)

FOREIGN PATENT DOCUMENTS

WO     2013189261 A1    12/2013

OTHER PUBLICATIONS

Weinberg, Jonathan, Lawrence D. Brown, and Jonathan R. Stroud. "Bayesian Forecasting of an Inhomogeneous Poisson Process with Applications to Call Center Data." (2006) (Year: 2006).*
(Continued)

*Primary Examiner* — Gurkanwaljit Singh (57) ABSTRACT

Systems and methods are disclosed for intelligent scheduling of calls to sales leads, leveraging machine learning (ML) to optimize expected results. One exemplary method includes determining, using a connectivity prediction model, call connectivity rate predictions; determining timeslot resources; allocating, based at least on the call connectivity rate predictions and timeslot resources, leads to timeslots in a first time period; determining, within a timeslot and using a lead scoring model, lead prioritization among leads within the timeslot; configuring, based at least on the lead prioritization, the telephone unit with lead information for placing a phone call; and applying a contextual bandit (ML) process to update the connectivity prediction model, the lead scoring model, or both. During subsequent time periods, the updated connectivity prediction and lead scoring models are used, thereby improving expected results over time.

20 Claims, 6 Drawing Sheets

(51) Int. Cl.
- H04M 3/52 (2006.01)
- H04M 3/51 (2006.01)
- G06N 20/00 (2019.01)
- G06Q 10/04 (2012.01)
- G06Q 10/06 (2012.01)
- G06Q 10/10 (2012.01)
- G06F 9/50 (2006.01)
- G06K 9/62 (2006.01)
- H04M 3/523 (2006.01)
- G06N 7/00 (2006.01)
- G06N 3/08 (2006.01)
- G06N 20/20 (2019.01)

(52) U.S. Cl.
CPC ............... *G06N 3/08* (2013.01); *G06N 7/005* (2013.01); *G06N 20/00* (2019.01); *G06Q 10/04* (2013.01); *G06Q 10/067* (2013.01); *G06Q 10/1097* (2013.01); *H04M 3/523* (2013.01); *G06N 20/20* (2019.01)

(58) Field of Classification Search
USPC ............. 379/266.01, 265.02, 266.08, 265.11
See application file for complete search history.

(56) References Cited

U.S. PATENT DOCUMENTS

| | | | | |
|---|---|---|---|---|
| 6,466,664 | B1* | 10/2002 | Zhao | H04M 3/5158 379/265.1 |
| 7,023,979 | B1* | 4/2006 | Wu | H04M 3/5233 379/265.11 |
| 7,599,842 | B2 | 10/2009 | Tivey et al. | |
| 8,750,488 | B2 | 6/2014 | Spottiswoode et al. | |
| 9,674,354 | B2* | 6/2017 | Waller | G06Q 30/0203 |
| 10,235,628 | B1* | 3/2019 | Merritt | G06N 5/003 |
| 10,694,039 | B2* | 6/2020 | Charlson | H04M 3/5141 |
| 2006/0265259 | A1* | 11/2006 | Diana | G06Q 30/08 705/35 |
| 2015/0237205 | A1* | 8/2015 | Waller | H04M 3/5158 379/266.08 |
| 2016/0212266 | A1* | 7/2016 | Soundar | H04M 3/5158 |
| 2016/0283888 | A1 | 9/2016 | Laing et al. | |
| 2017/0103413 | A1 | 4/2017 | He et al. | |
| 2017/0111503 | A1 | 4/2017 | McGann et al. | |
| 2017/0111509 | A1 | 4/2017 | Mcgann et al. | |
| 2017/0214799 | A1* | 7/2017 | Perez | H04M 3/5235 |
| 2017/0236134 | A1* | 8/2017 | Waller | H04M 3/5158 379/216.01 |
| 2017/0372267 | A1 | 12/2017 | Soffer et al. | |
| 2018/0013891 | A1* | 1/2018 | Charlson | H04M 3/5232 |
| 2019/0312974 | A1* | 10/2019 | Soundar | H04M 3/523 |

OTHER PUBLICATIONS

Aksin, Zeynep, Mor Armony, and Vijay Mehrotra. "The modern call center: A multi-disciplinary perspective on operations management research." Production and operations management 16.6 (2007): 665-688 (Year: 2007).*

Samuelson, Douglas A. "Predictive Dialing for Outbound Telephone Call Centers." Interfaces 29.5 (1999): 66-94 (Year: 1999).*

De Freitas Filho, Paulo J., et al. "Using simulation to predict market behavior for outbound call centers." 2007 Winter Simulation Conference. IEEE, 2007 (Year: 2007).*

Badanidiyuru, Ashwinkumar, Robert Kleinberg, and Aleksandrs Slivkins. "Bandits with knapsacks." 2013 IEEE 54th Annual Symposium on Foundations of Computer Science. IEEE, 2013. (Year: 2013).*

Cayci, Semih, Atilla Eryilmaz, and Rayadurgam Srikant. "Learning to control renewal processes with bandit feedback." Proceedings of the ACM on Measurement and Analysis of Computing Systems 3.2 (2019): 1-32. (Year: 2019).*

Krishnamurthy, Vikram, and Robin J. Evans. "Hidden Markov model multiarm bandits: a methodology for beam scheduling in multitarget tracking." IEEE Transactions on Signal Processing 49.12 (2001): 2893-2908. (Year: 2001).*

"Call Connect Genius", Retrieved from: https://www.principa.co.za/contact-centre-solutions/predict-right-time-to-call-using-machine-learning/, Retrieved Date: Jan. 17, 2019, 3 Pages.

"Machine learning implementation strategy for a customer service center", Retrieved from: https://blogs.msdn.microsoft.com/crm/2018/02/07/machine-learning-implementation-strategy-for-a-customer-service-center/, Feb. 7, 2018, 13 Pages.

Joy, Tony, "Smart Scheduler—Find the best times to call voters", Retrieved from: https://callhub.io/smart-scheduler-find-best-times-call-voters/, May 23, 2017, 8 Pages.

McFarlane, Keith, "Contextual Routing: The Future of Customer Experience Management", Retrieved from: https://www.business2community.com/customer-experience/contextual-routing-future-customer-experience-management-0943788, Jul. 14, 2014, 7 Pages.

Schulman, John, "Deep Reinforcement Learning", Retrieved from: http://rll.berkeley.edu/deeprlcourse-fa15/docs/2015.08.26.Lecture01Intro.pdf, Aug. 26, 2015, pp. 1-37.

"International Search Report Issued in PCT Application No. PCT/US20/015512", dated Apr. 28, 2020, 11 Pages.

* cited by examiner

INTELLIGENT SCHEDULING TOOL

BACKGROUND

Sales call centers often deal with challenges in scheduling large numbers of calls to widely varying sales leads. Existing call schedulers typically construct filters and policies for lead assignments manually, and sort leads based on a prioritization score. The filters and policies include lead time zone, number of call times, marketing lists, and other criteria. Unfortunately, in many prior solutions, there is no solution for intelligently determining the best time to call; leads can be assigned to any timeslot based on the scheduler's configuration—including sub-optimal timeslots. Thus, there is a need for a solution to identify the best, or optimal, time to contact leads.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some aspects disclosed herein are directed to systems and methods for intelligent scheduling of calls to sales leads, leveraging machine learning (ML) to optimize expected results. One exemplary method includes determining, using a connectivity prediction model, call connectivity rate predictions; determining timeslot resources; allocating, based at least on the call connectivity rate predictions and timeslot resources, leads to timeslots in a first time period; determining, within a timeslot and using a lead scoring model, lead prioritization among leads within the timeslot; configuring, based at least on the lead prioritization, the telephone unit with lead information for placing a phone call; and applying a contextual bandit (ML) process to update the connectivity prediction model, the lead scoring model, or both. During subsequent time periods, the updated connectivity prediction and lead scoring models are used, thereby improving expected results over time.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Sales call centers often deal with challenges in scheduling large numbers of calls to widely varying sales leads. Existing call schedulers typically construct filters and policies for lead assignments manually, and sort leads based on a prioritization score. The filters and policies include lead time zone, number of call times, marketing lists, and other criteria. Unfortunately, in many prior solutions, there is no solution for intelligently determining the best time to call; leads can be assigned to any timeslot based on the scheduler's configuration—including sub-optimal timeslots. Thus, there is a need for a solution to identify the best, or optimal, time to contact leads.

Therefore, some aspects disclosed herein are directed to systems and methods for intelligent scheduling of calls to sales leads, leveraging machine learning (ML) to optimize expected results. One exemplary method includes determining, using a connectivity prediction model, call connectivity rate predictions; determining timeslot resources; allocating, based at least on the call connectivity rate predictions and timeslot resources, leads to timeslots in a first time period; determining, within a timeslot and using a lead scoring model, lead prioritization among leads within the timeslot; configuring, based at least on the lead prioritization, the telephone unit with lead information for placing a phone call; and applying a contextual bandit (ML) process to update the connectivity prediction model, the lead scoring model, or both. During subsequent time periods, the updated connectivity prediction and lead scoring models are used, thereby improving expected results over time.

The various examples of intelligent scheduling optimally arrange calls to leads to achieve best sales qualified opportunity (SQO), and include multiple parts such as an improved scheduling engine, dynamic lead scoring, and components that determine the best time to call a lead. The improved scheduling engine filters and arranges leads based on pre-defined rules with flexible configurations. Dynamic lead scoring considers the factor of dynamic time decay, and solves the problem of predicting the best lead to call at a specific time, using the most updated information. A solution for determining the best time to call is to arrange leads into daily timeslots based on each lead's best expected call connectivity rate and timeslot availabilities. A lead allocation strategy considers both the objective of improving overall call connectivity and the constraints of available seller resources in each timeslot, and globally optimizes the solution. A prioritization score is computed by a machine learning model when a lead is entered into a database. Determining the best time to call and performing optimal lead allocation has significant utility to users of the intelligent scheduling tool.

Various disclosed examples apply a call connectivity prediction model to meet the objective of improving overall call connectivity, subject to the constraints of available seller resources in each timeslot (optimal lead allocation), to globally optimize solutions on a daily (or other time period) basis. Contextual bandit learning is used, which is a mechanism for performing a tradeoff between applying the current optimal solution (exploitation) and exploring potential new optimization solutions. Historical call connection data is based on a past call schedule, which is biased and non-optimal. A supervised learning method will thus reach a biased sub-optimal solution, when training on the historical collected data. Context bandit learning, however, with its exploration mechanism, can help reach a global optimal solution. More detail is provided regarding contextual bandit learning in the description of FIG. 4.

Figure 1:
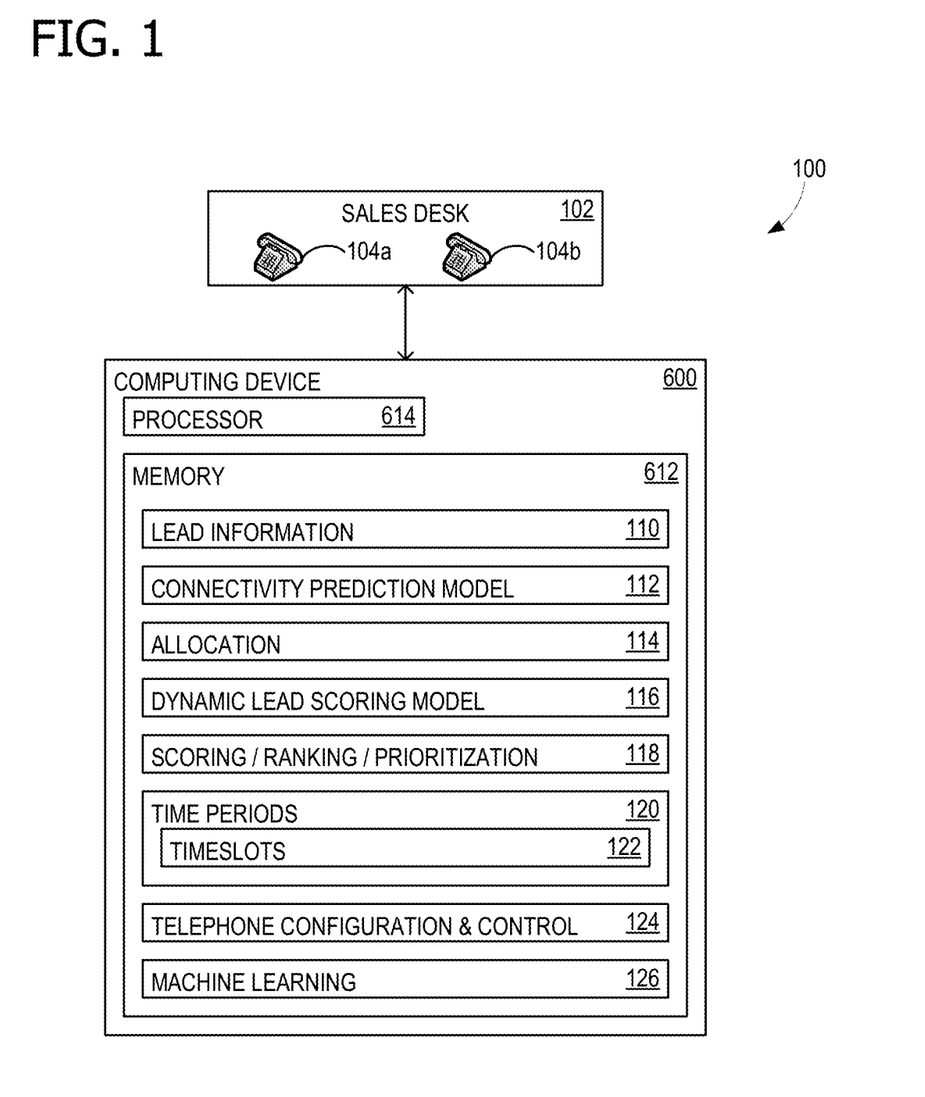
FIG. 1 shows an arrangement that can advantageously use an exemplary intelligent scheduling tool.

FIG. 1 shows an arrangement 100 that can advantageously use an exemplary intelligent scheduling tool. A sales desk 102 is staffed with sales representatives, and provided with a plurality of telephone units 104a and 104b. It should be understood that a different number of telephone units are used in some examples, and that sales desk 102 is geographically dispersed among a plurality of locations, in some examples. A computing device 600 is coupled to sales desk 102 to configure telephone units 104a and 104b with lead information for placing a phone call to a selected lead. That is, in some examples, telephone units 104a and 104b can be populated with the phone numbers to dial for a lead, so a sales representative does not need to enter the phone number manually. In some examples, computing device 600 further controls telephone units 104a and 104b, based at least on the configuration, to place phone calls under the additional input of a sales representative. More detail is provided regarding computing device 600 in the description of FIG. 6.

Computing device 600 includes a processor 614 and a memory 612. Memory 612 is a computer-readable medium storing data and also instructions that are executable by processor 614. The data and instructions (e.g., logic) include lead information 110, a connectivity prediction model 112, an allocation component 114, a dynamic lead scoring model 116, a scoring/ranking/prioritization component 118, data regarding time periods 120, which includes timeslots 122, a telephone unit configuration and control component 124, and a machine learning (ML) component 126. The operations and interactions of these components will be described in relation to FIGS. 2-6.

Figure 2:
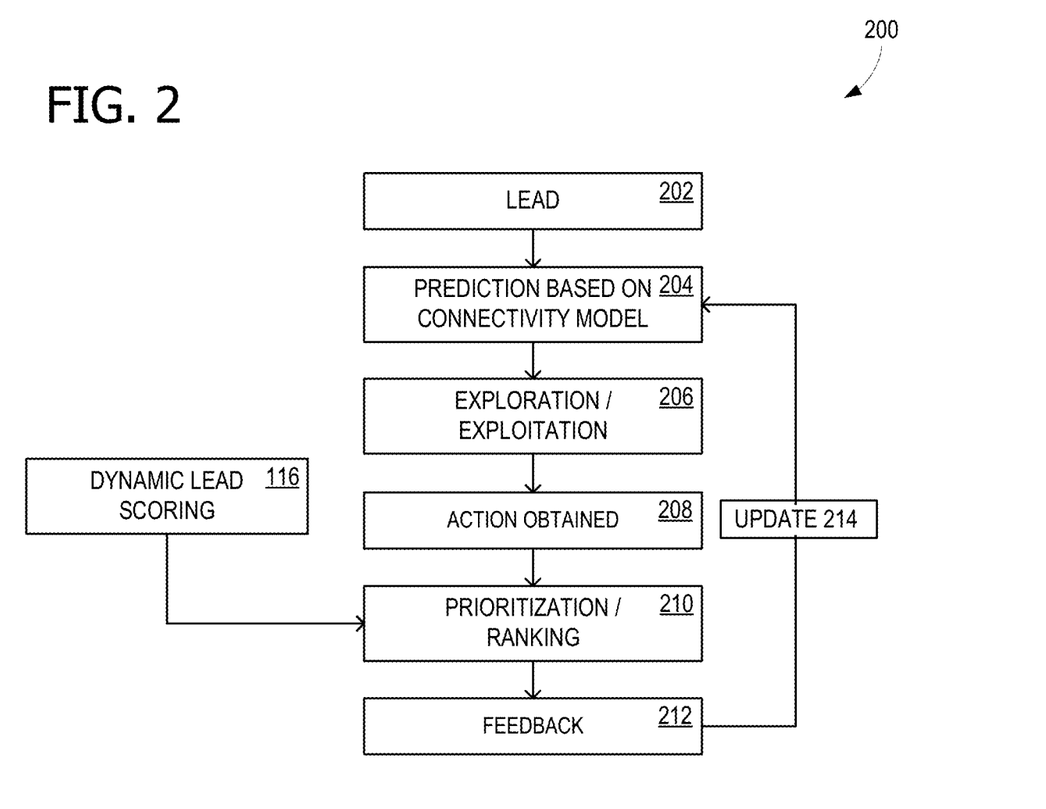
FIG. 2 is a block diagram illustrating exemplary aspects of intelligent scheduling.

FIG. 2 is a block diagram 200 illustrating exemplary aspects of intelligent scheduling, and is explained in relation to information regarding a single lead 202. When information regarding a single lead 202 is received, it is placed within lead information 110. Operation 204 includes making a prediction regarding an expected call connectivity rate for the lead, using connectivity prediction model 112. Contextual bandit learning is used within ML component 126 for an exploration/exploitation tradeoff, in operation 206. Some examples use Thompson sampling. Thompson sampling is a sampling method for choosing actions that addresses the exploration/exploitation dilemma in the bandit problem, and includes choosing the action that maximizes the expected reward with respect to a randomly drawn belief. The context bandit learning operation makes a tradeoff between applying the current optimal solution and making exploration, which helps optimize result in the long term.

A decision is made and an action is obtained in operation 208, for example selecting a lead. Dynamic lead scoring model 116 provides a predicted propensity for a SQO for the lead, which is used to provide a DLS score (dynamic lead scoring score). The DLS score is used by scoring/ranking/prioritization component 118, in operation 210, to prioritize the lead relative to other leads being considered for a call during the same timeslot. Feedback 212 from the call is used to update connectivity prediction model 112 for subsequent passes through operation 204.

Figure 3:
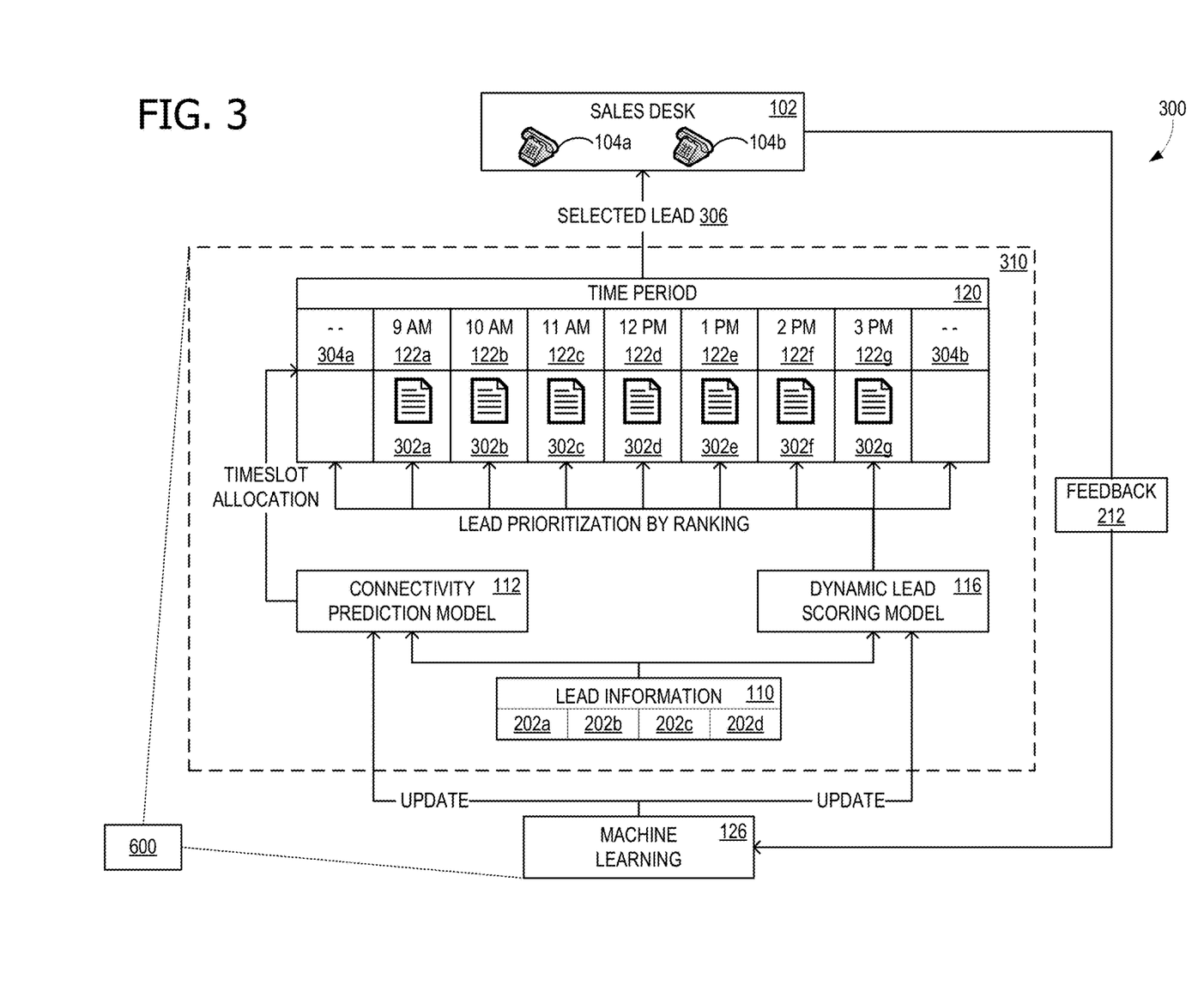
FIG. 3 is another block diagram illustrating exemplary aspects of intelligent scheduling.

FIG. 3 is a block diagram 300 illustrating exemplary aspects of intelligent scheduling. Lead information 110 includes information regarding multiple individual leads 202a-202d, although some examples include information on a larger number of leads. Lead information 110 includes phone numbers for leads, along with other information used by connectivity prediction model 112 and dynamic lead scoring model 116. Connectivity prediction model 112 uses allocation component 114 to allocate leads to timeslots 122a-122g during time period 120. In some examples, timeslots 122a-122g are hour-long timeslots, although different length timeslots are possible. In some examples, time period 120 is a day, although in some examples, time period 120 is a plurality of days (e.g. a week) or a work shift of less than a day. Time period 120 includes unallocated (unused) timeslots 304a and 304b, because timeslots 122a-122g are specified according to the seller's time zone and work shift, in the illustrated example. Leads can be located in different time zones than sales desk 102. Dynamic lead scoring model 116 assigns a score and scoring/ranking/prioritization component 118 provides prioritized lead lists 302a-302g in each of timeslots 122a-122g, respectively.

This process applies connectivity prediction model 112, and considers both the objective of improving overall call connectivity and the constraints of available seller resources in each of timeslots 122a-122g, thereby globally optimizing a solution for time period 120. Each of timeslots 122a-122g has constraints, of available telephone units (staffed by sales representatives at sales desk 102), a set of available time slots in the work shifts of the sales representatives, and others. The proposed approach described thus far includes dividing a time period into timeslots, and populating each timeslot with leads based on their predicted connectivity rate. Leads within each timeslot are served to sales representatives at sales desk 102 in the order of their propensity to SQO (e.g., their DLS score). The collection of lead information 110, connectivity prediction model 112, allocation component 114, dynamic lead scoring model 116, scoring/ranking/prioritization component 118, and time periods 120 containing timeslots 122 together form a sales intelligence backend 310. Sales intelligence backend 310 runs the processes described herein, for example on computing device 600 on a schedule (e.g., daily, weekly, or more often as needed) to optimize operations on an ongoing basis.

When connectivity rates for each lead have been predicted, per timeslot in the lead's time zone, the proper timeslot (e.g., one of timeslots 122a-122g) in the sales desk 102 time zone is identified. One approach is to construct a list of leads for each timeslot 122a-122g by selecting the best K timeslots for each lead. The leads in each of timeslots 122a-122g are ranked by their DLS score (produced by dynamic lead scoring model 116) and prioritized for sales representatives, according to the ranking, from highest to lowest DLS score. With this approach, it is possible that there is an uneven distribution of leads across timeslots 122a-122g. In some situations, leads allocated to some of timeslots 122a-122g may by exhausted before the end of the timeslot. When this occurs, in some examples, the next lead to call will be the next best lead (based on DLS score) across all open leads, including those allocated to different timeslots. However, in other situations, the leads allocated to some of timeslots 122a-122g may be more than what can be dialed during the timeslot. When this occurs, leads that are allocated to more than one timeslot should be called during a different timeslot, if their DLS score is sufficiently high.

In some examples, lead allocation is globally optimized across all timeslots. With this approach, the overall predicted connectivity rates among all open leads is maximized, subject to the several constraints, including call capacity within each timeslot and the total number of available timeslots for each lead. This approach applies integer linear programming to determine the globally optimal K timeslots and can be solved using a cutting-plane method or a branch-bound method. The approach includes selecting a portion of leads for contextual bandit learning with the remaining leads optimally assigned in a timeslot with predefined capacity for each timeslot. For example, there are N leads to be in K time slots, where each lead should be in at most k timeslots. The reward of assigning lead i to time slot j is $r_{ij}$. In the simple case, the reward is the logarithm of the predicted connectivity rate. The maximum number of leads to be allocated to a timeslot j is $v_j$. The goal is to maximize the total rewards for all leads. The problem can be formulated as:

$$\text{maximize} \sum_{i=1}^{N} \sum_{j=1}^{K} r_{ij} x_{ij} \qquad \text{Eq. (1)}$$

$$\text{subject to} \sum_{i=1}^{N} x_{ij} \leq v_j, \sum_{j=1}^{K} x_{ij} = k, x_{ij} = 0 \text{ or } 1 \qquad \text{Eq. (2)}$$

The first approach, described above, is a special case in which k=1 and $v_j$ equals the number of leads calculated for each timeslot in the first approach.

When sales representatives are ready to place a call to the next lead, telephone unit configuration and control component 124 selects the next lead from one of prioritized lead lists 302a-302g, based on the current time, and forwards information regarding the selected lead 306 to sales desk 102. That is, telephone unit configuration and control component 124 configures, based at least on the lead prioritization, telephone unit 104a or 104b with lead information 306 for placing a phone call to the selected lead. In some examples, telephone unit configuration and control component 124 controls telephone unit 104a or 104b, based at least on the configuration, to place the phone call.

Figure 4:
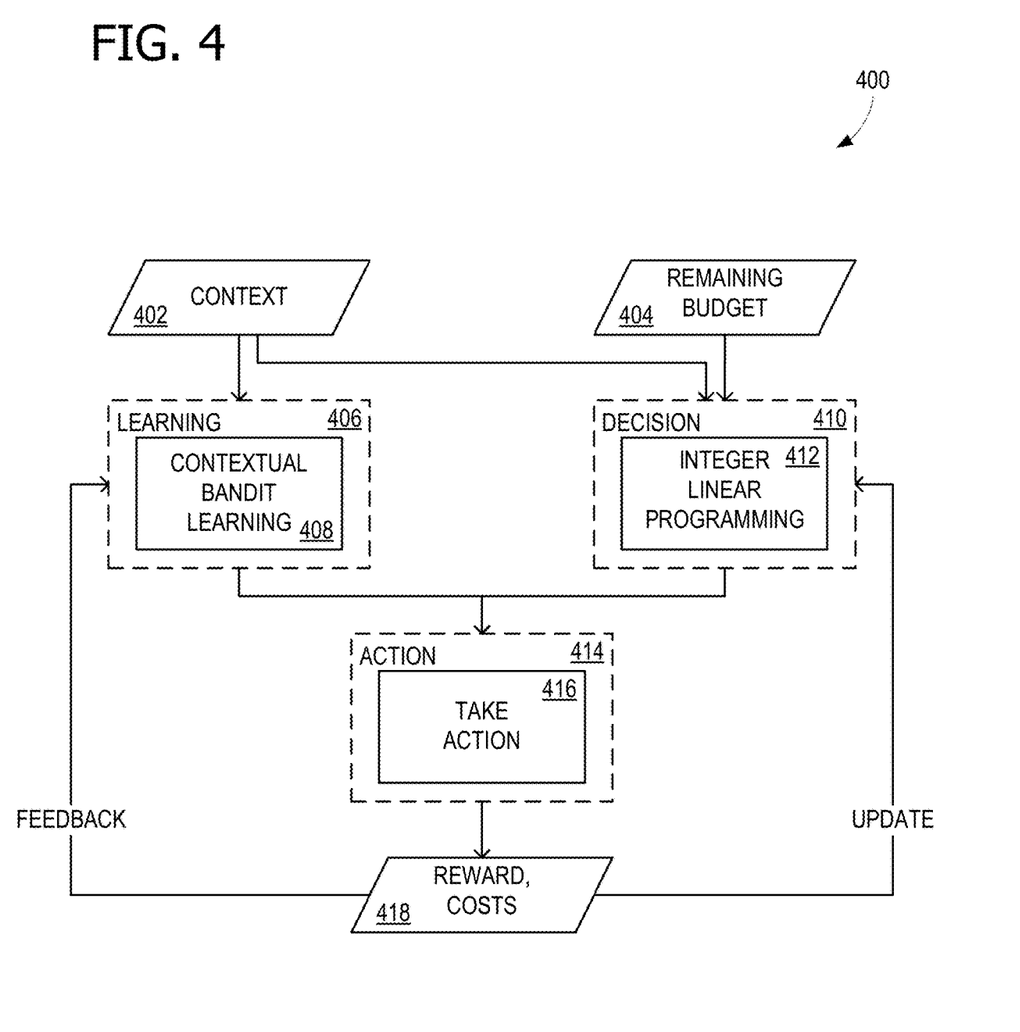
FIG. 4 is another block diagram illustrating exemplary aspects of machine learning (ML) for intelligent scheduling.

ML component 126 helps provide a ML system design combining an optimization method based on historical data and a contextual bandit process by exploiting the mechanism of exploration/exploitation. Contextual bandit learning uses historical data and exploration to find better solution than what historical data alone can provide. There are multiple exploration/exploitation mechanisms, including epsilon-greedy, upper confidence bound, Thompson Sampling, and others. In some examples, estimates can be made for a prior distribution of the estimated parameter, and Thompson Sampling is be used for exploration in contextual bandit learning. In FIG. 4, block diagram 400 illustrates exemplary aspects of machine learning (ML) for intelligent scheduling, specifically a framework of combining contextual bandit learning and integer linear programming for scheduling.

In the contextual multi-armed bandit problem, an agent must choose between options of exploiting existing learning and exploring new learning. Over time, the learner's aim is to collect enough information about how the context vectors and rewards relate to each other, so that it can predict the next best choice. In practice, there is usually a cost associated with the resource consumed by each action and the total cost is limited by a budget in many applications.

In FIG. 4, context 402 is provided to both a learning component 406, which has a contextual bandit learning component 408, and a decision component 410, which has an integer linear programming component 412. A remaining budget 404 is provided to decision component 410. Learning component 406 provides actions an action component 414, and decision component 410 provides probabilities to action component 414. Action component 414 takes action 416, and the results are reward and costs 418. Reward and costs 418 are provided to learning component 406 as feedback and to decision component 410 as an update.

In general, the contextual bandit learning problem can be described for t=1, . . . , T as:

The world produces some context $x_t \in X$.
The learner chooses an action $a_t \in A$, where $A = \{1, \ldots, K\}$.
The world reacts with reward $r_t(a_t) \in [0, 1]$.

Each experimental unit i consists of the component ($x_i$, $a_i, r_i, p_i$). Content $x_i$ is observed, which includes features of a lead. Action $a_i$ is drawn independently at random from distribution $p_i(\cdot|x_i)$, where $p_i$ is the probability assigned by the exploration policy $\pi: X \to A$ to $a_i$. An outcome is realized and observed, including reward $r_i$.

Context, action space, outcome, and rewards are defined as follows: Context is the features of leads as used in supervised learning. Features include but not limited to:

Phone Call Features: LeadId, CallCreatedDate, CallActualStart, CallActualEnd, CallDisposition, CallDescription, CallSubject, and CallOwnerId.

Lead Information Features: LeadId, LeadNumber, LeadCreatedDate, WWLMResponseId, BusinessPhone, CompanyName, Country, EmailAddress, FirstName, LastName, JobTitle, MobilePhone, TacticName, LeadStatus, and LeadPriority.

Marketing Interaction Features: EmailAddress, ActivityDate, ActivityType, and ActivityAttribute, PrimaryAttributeValue.

The action space includes timeslots (e.g., timeslots 122a-122g). The outcomes include phone call answered or phone call not answered. A reward will be assigned based on whether the phone call is answered: Answered=1; Not answered=−1.

A generalized linear contextual bandit method for solving the problem of best time to call. At time t the reward $r_t$ can be expressed as $$r_t = r(\pi(x_t), x_t) + \epsilon_t \qquad \text{Eq. (3)}$$

Where r is an unknown function. The best action at time t is:

$$a^*_t = \text{argmax}_{\{a \in A\}} r(a, x_t) \qquad \text{Eq. (4)}$$

For generalized linear bandits, without loss of generality, the full context associated with action $a_t$ as $z_t$, then is:

$$r(\pi(x_t), x_t) = r(z_t) = \mu(\theta^T z_t) \qquad \text{Eq. (5)}$$

for some $\theta \in R^d$, where d is the dimension of variables. In this setting, the question becomes which $z_t$ should be chosen at each round, with both exploration and exploitation taken into consideration. From the perspective of supervised learning, if logistic regression is used as the model:

$$P(r_t = 1 | z_t, \theta) = \frac{1}{1 + \exp(-\theta^T z_t)}, \qquad \text{Eq. (6)}$$

then the optimal $\hat{\theta}$ can be obtained by:

$$\hat{\theta} = \text{argmin}_{\{\theta \in R^d\}} \frac{\lambda}{2} \|\theta\|^2 + \sum_{i=1}^{T} \log(1 + \exp(-r_i \theta^T z_i)) \qquad \text{Eq. (7)}$$

This is an optimal point estimation from the view from frequentist reasoning, and the value can be used for exploitation. For exploration, one option is to take the Bayesian view on this problem, and apply Thompson Sampling. If the prior $$\theta \sim N\left(0, \frac{1}{\lambda}I_d\right),$$

then, based on Bayes rule with an approximation using Laplace distribution (the posterior distribution p(θ|D) has no closed form expression), the result is:

$$p(\theta|D) \sim N(\hat{\theta}, \text{Diag}(q_i^{-1})) \qquad \text{Eq. (8)}$$

Where $\hat{\theta}$ is the optimal estimation as shown previously, and $$q_i = \sum_{j=1}^{T} z_{j,i}^2 p_j(1-p_j) \qquad \text{Eq. (9)}$$

with $$p_j = \left(1 + \exp\left(-\hat{\theta}^T z_j\right)\right)^{-1} \qquad \text{Eq. (10)}$$

To enable batch updates, using B from a previous estimation, for each new batch data $D^{(k)}=(x_j,a_j,r_j)$ where $1 \le j \le T$:

$$p(\theta | D^{(k)}) \sim N(m, \text{Diag}(q_i^{-1})) \qquad \text{Eq. (11)}$$

where $$m = \text{argmin}_{\{\theta \in R^d\}} \frac{1}{2}\sum_{i=1}^{d} q_i(\theta_i - m_i)^2 + \sum_{i=1}^{T} \log(1 + \exp(-r_i\theta^T z_i)) \qquad \text{Eq. (12)}$$

The posterior mean $\hat{\theta}$ is the previously proposed estimator of θ.

An example procedure can be constructed as:
A new lead arrives at time t.
A vector is sampled from the current posterior $\tilde{\theta}(t) \sim N(m, \text{Diag}(q_i^{31\ 1}))$.
A $z_i$ (or action $a_i$) is chosen that maximizes the probability in the sampled model, and the response $r_i$ is obtained:

$$\hat{z}_t = \text{argmax}_{\{z \in D_t\}} \frac{1}{1 + \exp\left(-\tilde{\theta}(t)^T z_t\right)} \qquad \text{Eq. (13)}$$

This is iterated T times, and a new batch of training ($x_i$, $r_i$), $1 \le i \le T$ becomes available.

To deploy a contextual bandit learning system, one approach is to run ML component 126 on a schedule. On each run, the model is updated based on batch data collected from the previous time period. Then based on the updated model, a timeslot (action) is assigned to each lead for the next time period. When sales agents at sales desk 102 request the next lead, leads assigned in the timeslot at that specific time are preferably selected ordered by DLS score and filtered by other policies. In some examples, if leads in the timeslot are not enough to serve sales representatives, other leads will be served, though the rewards for those other leads will not be used for model updates. In some examples, new leads are not associated with reward feedback unless timeslots had been chosen for them.

Figure 5:
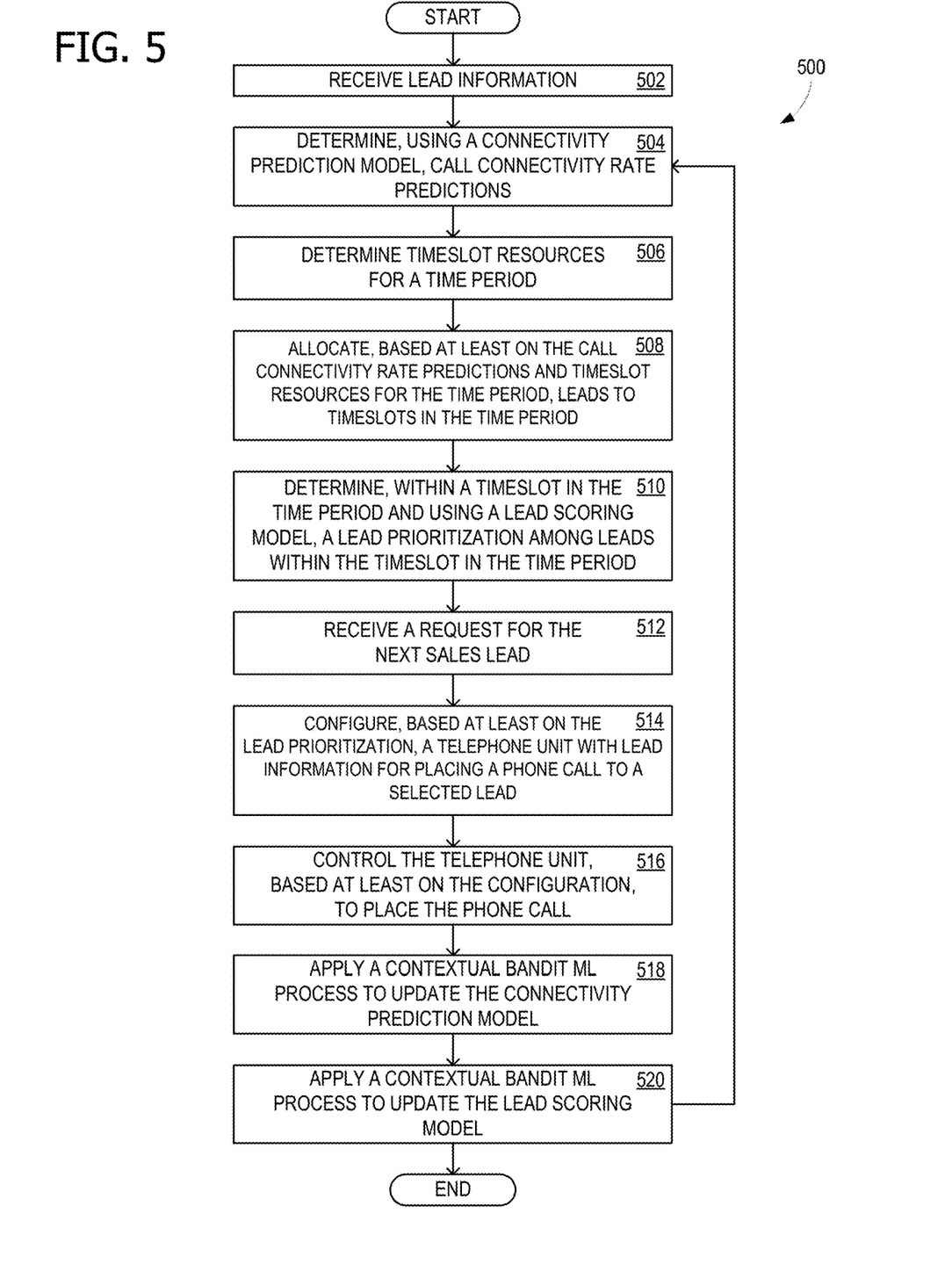
FIG. 5 is a flow chart illustrating exemplary operations involved in intelligent scheduling.

FIG. 5 is a flow chart 500 illustrating exemplary operations involved in intelligent scheduling. In some examples, the following operations are implemented as computer-executable instructions stored on and executed by computing device 600. Operation 502 includes receiving lead information, for example lead information 202a-202d that is placed within lead information 110 for storage in memory 612. Operation 504 includes determining, using a connectivity prediction model (e.g., connectivity prediction model 112), call connectivity rate predictions. On an initial pass through operation 504, this will be determining first call rate connectivity predictions. On a subsequent pass through operation 504, this will be determining second call rate connectivity predictions.

Operation 506 includes determining timeslot resources for a time period (e.g., time period 120). In some examples, the timeslot resources comprise a plurality of available telephone units and a set of available time slots. In some examples, the time period comprises at least one selected from the list consisting of: a day, a work shift of less than a day, and a plurality of days. Operation 508 includes allocating, based at least on the call connectivity rate predictions and timeslot resources for the time period, leads to timeslots (e.g., timeslots 122a-122g) in the time period. Operation 510 includes determining, within a timeslot in the time period and using a lead scoring model (e.g., dynamic lead scoring model 116), a lead prioritization among leads within the timeslot in the time period. In some examples, the lead prioritizations are reflected in the prioritized lead lists 302a-302g in each of timeslots 122a-122g, respectively.

Operation 512 includes receiving a request for the next sales lead, for example from sales desk 102. Operation 514 includes configuring, based at least on the lead prioritization, a telephone unit (e.g., one of telephone units 104a and 104b) with lead information for placing a phone call to a selected lead. In some examples, this includes populating the telephone unit with the phone number for the lead, so that a sales representative does not need to manually dial the number. Operation 516 includes controlling the telephone unit, based at least on the configuration, to place the phone call.

Operation 518 then includes applying a contextual bandit ML process to update the connectivity prediction model, for example ML component 126. Operation 520 includes applying a contextual bandit ML process to update the lead scoring model. In some examples, ML component 126 applies a contextual bandit ML process to both the connectivity prediction model and the lead scoring model. Flow chart 500 then returns to operation 504 for the next run, in which the updated connectivity prediction model and the lead scoring model are used for second call connectivity rate predictions in a second time period. Ongoing operations result in the iteration of operations 504-520 for subsequent time periods.

ADDITIONAL EXAMPLES

Some aspects and examples disclosed herein are directed to a system for intelligent scheduling comprising a telephone unit; a processor coupled to the telephone unit; and a computer-readable medium storing instructions that are operative when executed by the processor to: determine, using a connectivity prediction model, first call connectivity rate predictions; determine timeslot resources for a first time period; allocate, based at least on the first call connectivity rate predictions and timeslot resources for the first time period, leads to timeslots in the first time period; determine, within a timeslot in the first time period and using a lead scoring model, a first lead prioritization among leads within the timeslot in the first time period; configure, based at least on the first lead prioritization, the telephone unit with lead information for placing a phone call to a selected lead; and apply a contextual bandit ML process to update the connectivity prediction model.

Additional aspects and examples disclosed herein are directed to a process for intelligent scheduling comprising: determining, using a connectivity prediction model, first call connectivity rate predictions; determining timeslot resources for a first time period; allocating, based at least on the first call connectivity rate predictions and timeslot resources for the first time period, leads to timeslots in the first time period; determining, within a timeslot in the first time period and using a lead scoring model, a first lead prioritization among leads within the timeslot in the first time period; configuring, based at least on the first lead prioritization, a telephone unit with lead information for placing a phone call to a selected lead; and applying a contextual bandit machine learning (ML) process to update the connectivity prediction model.

Additional aspects and examples disclosed herein are directed to one or more computer storage devices having computer-executable instructions stored thereon for intelligent scheduling, which, on execution by a computer, cause the computer to perform operations comprising: determining, using a connectivity prediction model, first call connectivity rate predictions; determining timeslot resources for a first time period; allocating, based at least on the first call connectivity rate predictions and timeslot resources for the first time period, leads to timeslots in the first time period; determining, within a timeslot in the first time period and using a lead scoring model, a first lead prioritization among leads within the timeslot in the first time period; configuring, based at least on the first lead prioritization, a telephone unit with lead information for placing a phone call to a selected lead; and applying a contextual bandit machine learning (ML) process to update the connectivity prediction model.

Alternatively, or in addition to the other examples described herein, examples include any combination of the following:
  controlling the telephone unit, based at least on the configuration, to place the phone call;
  the time period comprises a day;
  the time period comprises a plurality of days;
  applying a contextual bandit ML process to update the lead scoring model;
  the timeslot resources comprise a plurality of available telephone units and a set of available time slots;
  determining, using the updated connectivity prediction model, second call connectivity rate predictions; determining timeslot resources for a second time period; allocating, based at least on the second call connectivity rate predictions and timeslot resources for the second time period, leads to timeslots in the second time period; determining, within a timeslot in the second time period and using a lead scoring model, a second lead prioritization among leads within the timeslot in the second time period; and configuring, based at least on the second lead prioritization, the telephone unit with lead information for placing a phone call to a selected lead; and
  the time period comprises at least one selected from the list consisting of: a day and a work shift of less than a day.

While the aspects of the disclosure have been described in terms of various examples with their associated operations, a person skilled in the art would appreciate that a combination of operations from any number of different examples is also within scope of the aspects of the disclosure.

Example Operating Environment

Figure 6:
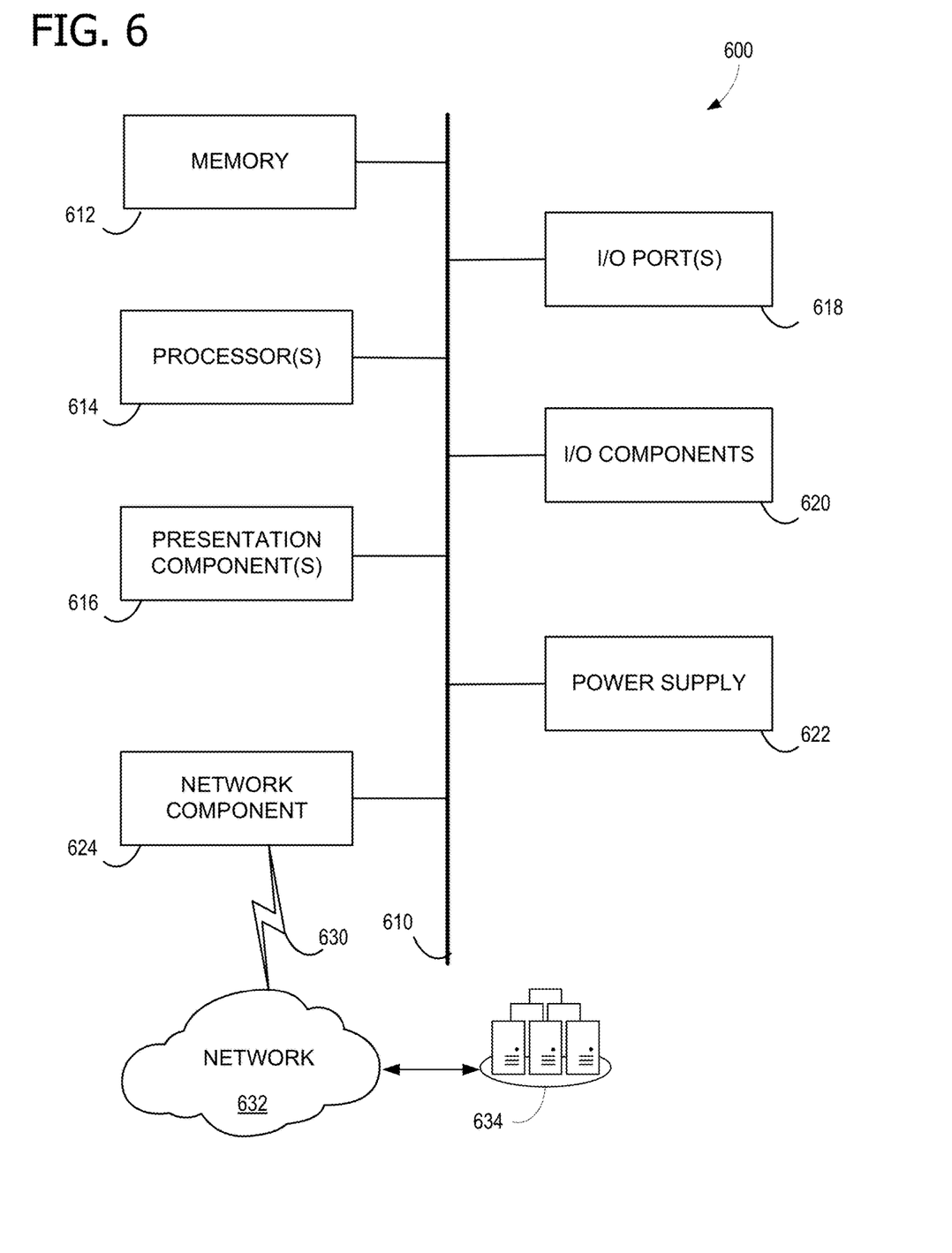
FIG. 6 is a block diagram of an example computing environment suitable for implementing some of the various examples disclosed herein.

FIG. 6 is a block diagram of example computing device 600 for implementing aspects disclosed herein, and is designated generally as computing device 600. Computing device 600 is but one example of a suitable computing environment and is not intended to suggest any limitation as to the scope of use or functionality of the examples disclosed herein. Neither should the computing device 600 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The discloses examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 600 includes a bus 610 that directly or indirectly couples the following devices: computer-storage memory 612, one or more processors 614, one or more presentation components 616, input/output (I/O) ports 618, I/O components 620, a power supply 622, and a network component 624. Computer device 600 should not be interpreted as having any dependency or requirement related to any single component or combination of components illustrated therein. While computer device 600 is depicted as a seemingly single device, multiple computing devices 600 may work together and share the depicted device resources. For instance, computer-storage memory 612 may be distributed across multiple devices, processor(s) 614 may provide housed on different devices, and so on.

Bus 610 represents what may be one or more busses (such as an address bus, data bus, or a combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and reiterate that the diagram of FIG. 6 is merely illustrative of an exemplary computing device that can be used in connection with one or more disclosed examples. Distinction is not made between such categories as "workstation," "server," "laptop," "hand-held device," etc., as all are contemplated within the scope of FIG. 6 and the references herein to a "computing device." Computer-storage memory 612 may take the form of the computer-storage media references below and operatively provide storage of computer-readable instructions, data structures, program modules and other data for the computing device 600. For example, computer-storage memory 612 may store an operating system, a universal application platform, or other program modules and program data. Computer-storage memory 612 may be used to store and access instructions configured to carry out the various operations disclosed herein.

As mentioned below, computer-storage memory 612 may include computer-storage media in the form of volatile and/or nonvolatile memory, removable or non-removable memory, data disks in virtual environments, or a combination thereof. And computer-storage memory 612 may include any quantity of memory associated with or accessible by the computing device 600. The memory 612 may be internal to the computing device 600 (as shown in FIG. 6), external to the computing device 600 (not shown), or both (not shown). Examples of memory 612 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 600. Additionally, or alternatively, the computer-storage memory 612 may be distributed across multiple computing devices 600, e.g., in a virtualized environment in which instruction processing is carried out on multiple devices 600. For the purposes of this disclosure, "computer storage media," "computer-storage memory," "memory," and "memory devices" are synonymous terms for the computer-storage memory 612, and none of these terms include carrier waves or propagating signaling.

Processor(s) 614 may include any quantity of processing units that read data from various entities, such as memory 612 or I/O components 620. Specifically, processor(s) 614 are programmed to execute computer-executable instructions for implementing aspects of the disclosure. The instructions may be performed by the processor, by multiple processors within the computing device 600, or by a processor external to the client computing device 600. In some examples, the processor(s) 614 are programmed to execute instructions such as those illustrated in the flowcharts discussed below and depicted in the accompanying drawings. Moreover, in some examples, the processor(s) 614 represent an implementation of analog techniques to perform the operations described herein. For example, the operations may be performed by an analog client computing device 600 and/or a digital client computing device 600. Presentation component(s) 616 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 600, across a wired connection, or in other ways. Ports 618 allow computing device 600 to be logically coupled to other devices including I/O components 620, some of which may be built in. Examples I/O components 620 include, for example but without limitation, a microphone, joystick, game pad, satellite dish, scanner, printer, wireless device, etc.

The computing device 600 may operate in a networked environment via the network component 624 using logical connections to one or more remote computers. In some examples, the network component 624 includes a network interface card and/or computer-executable instructions (e.g., a driver) for operating the network interface card. Communication between the computing device 600 and other devices may occur using any protocol or mechanism over any wired or wireless connection. In some examples, the network component 624 is operable to communicate data over public, private, or hybrid (public and private) using a transfer protocol, between devices wirelessly using short range communication technologies (e.g., near-field communication (NFC), Bluetooth™ branded communications, or the like), or a combination thereof. For example, network component 624 communicates over communication link 630 with network 632 with a cloud resource 634. Various examples of communication link 630 include a wireless connection, a wired connection, and/or a dedicated link, and in some examples, at least a portion is routed through the interne. In some examples, cloud resource 634 performs at least some of the operations described herein for computing device 600.

Although described in connection with an example computing device 600, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, holographic devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for intelligent scheduling, the system comprising:
a telephone unit;
a processor coupled to the telephone unit; and
a computer-readable medium storing instructions that are operative when executed by the processor to:
determine, using a connectivity prediction model, first call connectivity rate predictions;
determine timeslot resources for a first time period;
allocate, based at least on the first call connectivity rate predictions and timeslot resources for the first time period, leads to timeslots in the first time period using contextual bandit learning, the contextual bandit learning providing an option to exploit a current solution or to explore a new solution in order to identify a global optimal solution, wherein the contextual bandit learning analyzes context vectors to identify the global optimal solution;
determine, within a timeslot in the first time period and using a lead scoring model, a first lead prioritization among leads within the timeslot in the first time period;
configure, based at least on the first lead prioritization, the telephone unit with lead information for placing a phone call to a selected lead; and
update the connectivity prediction model using the contextual bandit learning.

2. The system of claim 1 wherein the instructions are further operative to:
control the telephone unit, based at least on the configuration, to place the phone call.

3. The system of claim 1 wherein the time period comprises a day.

4. The system of claim 1 wherein the time period comprises a plurality of days.

5. The system of claim 1 wherein the instructions are further operative to:
apply the contextual bandit learning to update the lead scoring model.

6. The system of claim 1 wherein the timeslot resources comprise a plurality of available telephone units and a set of available time slots.

7. The system of claim 1 wherein the instructions are further operative to:
determine, using the updated connectivity prediction model, second call connectivity rate predictions; determine timeslot resources for a second time period;
allocate, based at least on the second call connectivity rate predictions and timeslot resources for the second time period, leads to timeslots in the second time period;
determine, within a timeslot in the second time period and using a lead scoring model, a second lead prioritization among leads within the timeslot in the second time period; and
configure, based at least on the second lead prioritization, the telephone unit with lead information for placing a phone call to a selected lead.

8. A method of intelligent scheduling, the method comprising:
determining, using a connectivity prediction model, first call connectivity rate predictions;
determining timeslot resources for a first time period;
allocating, based at least on the first call connectivity rate predictions and timeslot resources for the first time period, leads to timeslots in the first time period using contextual bandit learning, the contextual bandit learning providing an option to exploit a current solution or to explore a new solution in order to identify a global optimal solution, wherein the contextual bandit learning analyzes context vectors to identify the global optimal solution;
determining, within a timeslot in the first time period and using a lead scoring model, a first lead prioritization among leads within the timeslot in the first time period;
configuring, based at least on the first lead prioritization, a telephone unit with lead information for placing a phone call to a selected lead; and
updating the connectivity prediction model using the context bandit learning.

9. The method of claim 8 further comprising:
controlling the telephone unit, based at least on the configuration, to place the phone call.

10. The method of claim 8 wherein the time period comprises a day.

11. The method of claim 8 wherein the time period comprises a plurality of days.

12. The method of claim 8 further comprising:
applying the contextual bandit learning to update the lead scoring model.

13. The method of claim 8 wherein the timeslot resources comprise a plurality of available telephone units and a set of available time slots.

14. The method of claim 8 further comprising:
determining, using the updated connectivity prediction model, second call connectivity rate predictions;
determining timeslot resources for a second time period;
allocating, based at least on the second call connectivity rate predictions and timeslot resources for the second time period, leads to timeslots in the second time period; determining, within a timeslot in the second time period and using a lead scoring model, a second lead prioritization among leads within the timeslot in the second time period; and
configuring, based at least on the second lead prioritization, the telephone unit with lead information for placing a phone call to a selected lead.

15. One or more computer storage devices having computer-executable instructions stored thereon for intelligent scheduling, which, on execution by a computer, cause the computer to perform operations comprising:
determining, using a connectivity prediction model, first call connectivity rate predictions;
determining timeslot resources for a first time period;
allocating, based at least on the first call connectivity rate predictions and timeslot resources for the first time period, leads to timeslots in the first time period using contextual bandit learning, the contextual bandit learning providing an option to exploit a current solution or to explore a new solution in order to identify a global optimal solution, wherein the contextual bandit learning analyzes context vectors to identify the global optimal solution;
determining, within a timeslot in the first time period and using a lead scoring model, a first lead prioritization among leads within the timeslot in the first time period;
configuring, based at least on the first lead prioritization, a telephone unit with lead information for placing a phone call to a selected lead; and
updating the connectivity prediction model using the context bandit learning.

16. The one or more computer storage devices of claim 15 wherein the operations further comprise:
controlling the telephone unit, based at least on the configuration, to place the phone call.

17. The one or more computer storage devices of claim 15 wherein the time period comprises at least one selected from the list consisting of:
a day and a work shift of less than a day.

18. The one or more computer storage devices of claim 15 wherein the operations further comprise:
applying the contextual bandit learning to update the lead scoring model.

19. The one or more computer storage devices of claim 15 wherein the timeslot resources comprise a plurality of available telephone units and a set of available time slots.

20. The one or more computer storage devices of claim 15 wherein the operations further comprise:
determining, using the updated connectivity prediction model, second call connectivity rate predictions;
determining timeslot resources for a second time period;
allocating, based at least on the second call connectivity rate predictions and timeslot resources for the second time period, leads to timeslots in the second time period;
determining, within a timeslot in the second time period and using a lead scoring model, a second lead prioritization among leads within the timeslot in the second time period; and
configuring, based at least on the second lead prioritization, the telephone unit with lead information for placing a phone call to a selected lead.

* * * * *